United States Patent [19]

Ise et al.

[11] Patent Number: 4,528,677
[45] Date of Patent: Jul. 9, 1985

[54] DATA TRANSMISSION SYSTEM

[75] Inventors: Masahiro Ise, Kashihara; Hidehiko Tanaka, Tenri; Katsuyuki Machino, Nara, all of Japan

[73] Assignee: Sharp Kabushiki Kaisha, Osaka, Japan

[21] Appl. No.: 501,252

[22] Filed: Jun. 6, 1983

[30] Foreign Application Priority Data

Jun. 9, 1982 [JP] Japan ................................. 57-99914

[51] Int. Cl.$^3$ .............................................. H04B 3/02
[52] U.S. Cl. ...................................... 375/36; 178/43; 179/82
[58] Field of Search ................. 178/43, 63 R; 179/82; 381/79, 80; 455/41, 55; 375/36

[56] References Cited

U.S. PATENT DOCUMENTS

| 2,499,180 | 2/1950 | Bossart | 178/43 |
| 2,596,013 | 5/1952 | Doriot | 455/41 |
| 3,543,262 | 11/1970 | Hutton | 179/82 |
| 3,740,549 | 6/1973 | Booth | 179/82 |
| 4,203,010 | 5/1980 | Brooks | 179/82 |
| 4,428,078 | 1/1984 | Kuo | 179/82 |

Primary Examiner—Benedict V. Safourek
Attorney, Agent, or Firm—Birch, Stewart, Kolasch & Birch

[57] ABSTRACT

A data transmission system including a pair of parallel transmission lines, applies data signals to the transmission lines through a transformer and an associated impedance connected across the lines. The transformer is magnetically coupled to at least one of the lines to apply a signal current thereto. The signal current is transferred to the other line through the impedance. The impedance is tuned to the transmission frequency so that it has a very low value during data transmission.

11 Claims, 5 Drawing Figures

DATA TRANSMISSION SYSTEM

BACKGROUND OF THE INVENTION

This invention relates to an improved data transmission system which is not prevented from performing accurate transmission by a load connected between both ends of transmission wirings or lines.

Generally data transmission wirings, particulary, using power wirings as service wirings are operated with a parallel signal input method. When a low impedance load is connected between both ends of power wirings, signals can not be transmitted because of a decrease in the receiving level.

FIG. 1 shows a circuit diagram of a general data transmission system using the parallel signal input method. The general transmission system comprises transmission wirings or lines 1, a transmitting station 2 (where $E_S$ is a transmitting output voltage and $Z_S$ is an output impedance of the transmitting station 2), a receiving station 3 (where $Z_R$ is an input impedance of the receiving station 3), loads 4 and 5 (where $Z_{LS}$ and $Z_{LR}$ are impedances of loads 4 and 5, respectively).

A receiving voltage $E_R$ can be expressed by the following equation.

$$E_R = \frac{Z_O}{Z_S + Z_O} \cdot E_S \quad (1)$$

$$\text{where } \frac{1}{Z_O} = \frac{1}{Z_{LS}} + \frac{1}{Z_{LR}} + \frac{1}{Z_R} \approx \quad (2)$$

$$\frac{1}{Z_{LS}} + \frac{1}{Z_{LR}}$$

(let $Z_R >> Z_{LS}, Z_{LR}$)

Further, if $Z_{LS} >> Z_{LR}$, the receiving voltage $E_R$ is given by the following equation in view of equations (1) and (2).

$$E_R = \frac{Z_{LR}}{Z_S + Z_{LR}} \cdot E_S \quad (1')$$

Accordingly, signals can not receive on the receiving station by using the voltage $E_R$ when $Z_{LR} \approx 0$. But, because a transmission current $I_S \approx 0$, a receiving current $I_R$ is given as follows:

$$I_R = I_S \approx \frac{E_S}{Z_S} \quad (3)$$

where the transmission current $I_R$ is maximum. Accordingly, signals can receive on the receiving station by using the current $I_R$.

But, when $Z_{LS} \approx 0$, the receiving current $I_R$ and the transmission current $I_S$ and the receiving voltage $E_R$ are given as follows:

$$I_S = I_R \approx 0, E_R \approx 0 \quad (4)$$

Effective signals for transmitting data are not applied on the transmitting wirings or lines 1 by using either current $I_R$ or the voltage $E_R$.

SUMMARY OF THE INVENTION

With the foregoing prior difficulty, it is an object of the present invention to provide an improved data transmission system which is not prevented from performing accurate transmission even by a load connected between both ends of two wirings or lines while the data are transmitted.

It is another object of the present invention to provide an improved data transmission system including two transmission wirings which can transmit data by using either the current or the voltage even when a low impedance load is connected between both ends of the wirings.

It is a further object of the present invention to provide an improved data transmission system including two transmission wirings, a magnetic coupling connected to one line, and an element connected between a pair of transmission wirings, the element showing a low impedance at a data transmitting frequency.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, a data transmission system including two transmission wirings comprises magnetic coupling means connected to at least one of said two wirings and element means connected between a pair of transmission wirings, the element means showing a low impedance at a data transmitting frequency for transferring data in the data transmission system, so that the magnetic coupling means and the element means apply the data to be transferred in the data transmission system.

According to another embodiment of the present invention, a data transmission system including two transmission wirings comprises magnetic coupling means connected to at least one of said wirings and element means connected between a pair of transmission wirings at both sides of the magnetic coupling means, the element showing a low impedance at a data transmitting frequency.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
FIG. 1 shows a circuit diagram of a conventional data transmission system.
Figure 2:
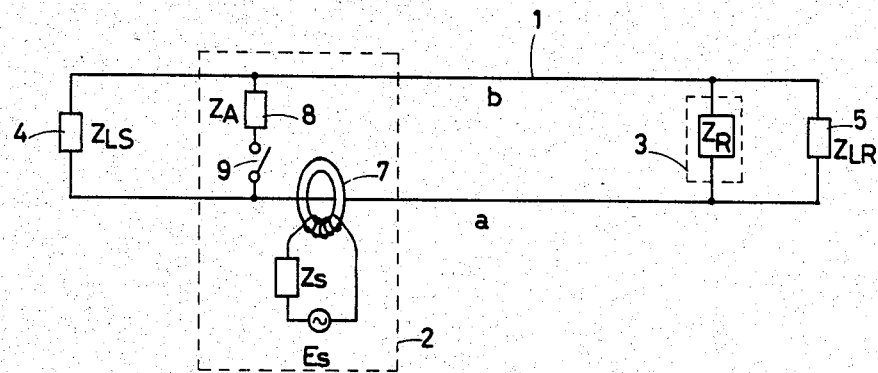
FIG. 2 shows a circuit diagram of a data transmission system according to an embodiment of the present invention.

FIG. 2 shows a circuit diagram of a data transmission system according to an embodiment of the present invention. Components similar to those in FIG. 1 are represented by the same reference numbers.

A transformer 7 at the transmitting station 2 applies transmission signals upon a transmission wiring a by using a magnetic coupling. An impedance element 8 (where an impedance is $Z_A$) applies a current induced on the wiring a to the other transmission wiring b. The impedance element 8 shows a low impedance at the data transmission frequency. (the impedance element 8 shows a high impedance in response to the application of a power supply frequency while signals are transmitted by the power wirings.) For example, the impedance element 8 may be a capacitor or a series resonance circuit including a capacitor and a coil, so that the resonance frequency is made identical with the transmitting frequency.

A switching means 9 is switched ON when signals are transmitted only from the transmitting station 2 so that the impedance element 8 does not function as a load or another transmission system.

Figure 3:
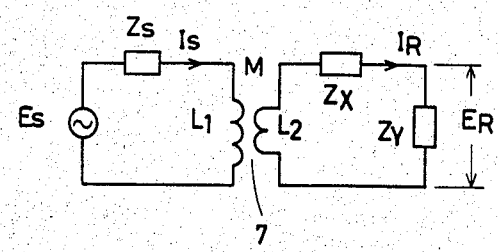
FIG. 3 shows an equivalent circuit of a data transmission system of FIG. 2.

FIG. 3 shows an equivalent circuit of FIG. 2. In FIG. 3, there are connected a series impedance $Z_X$, a signal detector impedance $Z_Y$, a mutual inductance M, the coils $L_1$ and $L_2$ having the numbers of turns $L_1$ and $L_2$. Using the symbols in FIG. 2, the impedances $Z_X$ and $Z_Y$ can be written as follows:

$$\frac{1}{Z_X} = \frac{1}{Z_{LS}} + \frac{1}{Z_A} \quad \text{(where switching means 9 is ON.)} \quad (5)$$

$$\frac{1}{Z_X} = \frac{1}{Z_{LR}} + \frac{1}{Z_R} \approx \frac{1}{Z_{LR}} \quad \text{(where } Z_R >> Z_{LR}\text{)}$$

A receiving current $I_R$ as shown in FIG. 3 is expressed by the following equation (6).

$$I_R = \frac{\pm j \cdot \omega \cdot M \cdot E_S}{\omega^2(L_1 \cdot L_2 - M^2) + j \cdot \omega \cdot L_2 \cdot Z_S + (Z_X + Z_Y)(j \cdot \omega \cdot L_1 - Z_S)} \quad (6)$$

where the signs $\pm$ are determined by the direction in which the coil is wound. Because the impedance $Z_A$ is set equal nearly zero, the impedance $Z_X$ becomes equal nearly zero. If $L_1$ is selected to be $\omega L_1 >> Z_S$, the receiving current $I_R$ is expressed by the following equation (6').

$$I_R \approx \frac{\pm j \cdot \omega \cdot M \cdot E_S}{\omega^2(L_1 \cdot L_2 - M^2) + j \cdot \omega(L_2 \cdot Z_S + L_1 \cdot Z_Y)} \quad (6')$$

If the transformer 7 is high coupled, a mutual inductance M becomes.

$$M^2 = L_1 \cdot L_2$$

By simplifying the equation (6'), the result can be written as:

$$I_R \approx \frac{\pm M \cdot E_S}{L_2 \cdot Z_S + L_1 \cdot Z_Y} \quad (7)$$

and a receiving voltage $E_R$ becomes:

$$E_R = Z_Y \cdot I_R \approx \frac{\pm M \cdot Z_Y \cdot E_S}{L_2 \cdot Z_S + L_1 \cdot Z_Y} \quad (8)$$

Accordingly, when $Z_Y \to \infty$, equations (7) and (8) are expressed as follows:

$$I_R \to 0, \quad E_R \to \pm \frac{M \cdot E_S}{L_1} = \pm \sqrt{\frac{L_2}{L_1}} \cdot E_S \quad (9)$$

When $Z_Y \to 0$, the equations (7) and (8) are expressed as follows:

$$I_R \to \pm \frac{M \cdot E_S}{L_2 \cdot Z_S} = \pm \frac{E_S}{Z_S} \sqrt{\frac{L_1}{L_2}}, \quad E_R \to 0 \quad (10)$$

Signals can be applied to the wirings by the current or voltage in spite of the value of the impedance $Z_{LR}$ and the impedance $Z_Y$.

Figure 4:
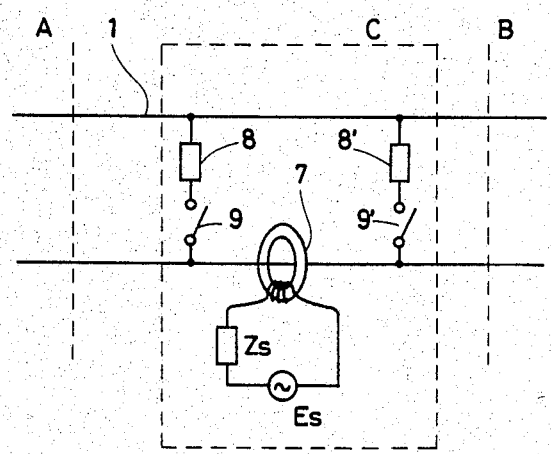
FIG. 4 shows a circuit diagram of a data transmission system of another embodiment of the present invention.

When another transmission system is present, a series circuit including the impedance 8 and the switching means 9 as shown in FIG. 2 may be set opposite to the transformer 7. FIG. 4 shows a circuit diagram of a transmission system which comprises the above series circuits connected to both sides of the transformer 7 according to another embodiment of the present invention.

Operation modes of the data transmission system as shown FIG. 4 can be set as shown in the following table 1 when the switching means 9 and 9' are ON and OFF. Accordingly, signals can transmitted in a desired direction in response to the connection of the switching means 9 and 9'.

TABLE 1

| switch 9 | switch 9' | Operation of System |
|---|---|---|
| OFF | OFF | The signals are not transmitted from station C. The signals can be transmitted between stations A and B. |
| OFF | ON | When the signals are transmitted between stations A and C, the signals are transmitted between neither stations A and B, or A and C. (The station A is isolated from the station B.) |
| ON | OFF | When the signals are transmitted between stations B and C, the signals are transmitted between neither stations A and B, or stations A and C. (the station A is isolated from the station B.) |
| ON | ON | The signals are not transmitted from station C, and the station A is isolated from the station B. |

In the present invention, receiving is executed by both a current coupling used as a magnetic coupling of the coils and a voltage coupling connected to two transmitting wirings. If the transmission system comprises a receiving circuit having a simple structure such as the embodiment of the present invention, receiving can be excuted easily.

Figure 5:
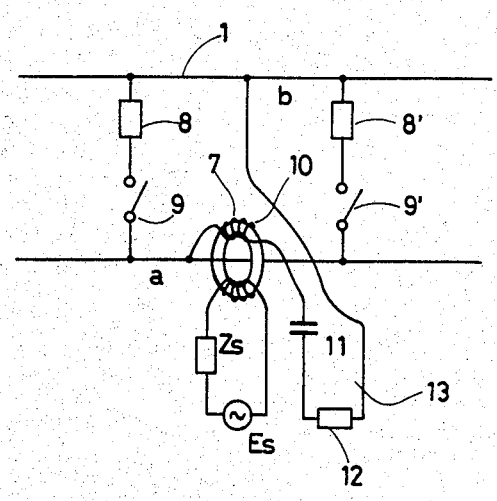
FIG. 5 shows a circuit diagram of a data transmission system according to still another embodiment of the present invention.

FIG. 5 shows a circuit diagram of the data transmission system including a transmission/receiving circuit using a core according to another embodiment of the present invention. As shown in FIG. 5, a coil 10 induces a current for flowing in a wiring a by using the magnetic flux coupling because the coil 10 is combined with the core of the transformer 7. Further, the coil 10 induces a voltage by connecting itself to wirings a and b. A capacitor 11 forms a series resonanse circuit with the coil 10, to induce only the signals corresponding to the transmitting frequency. An input impedance 12 is part of the receiving station 13. When the switching means 9 and 9' are ON, a voltage at both ends of the impedance 12 in the receiving station 13 becomes nearly zero, so that no signals are received at the receiving station.

In the above description, the data transmission system includes two transmission wirings, in which one of the transmission wirings is magnetically coupled a transmitter and, an element is provided for serving as a low impedance at the data transmission frequency, the element being connected between the two wirings. In the case where low impedance loads are connected between both ends of two wirings, data signals can be transmitted by using either current or voltage.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A data transmission system including a pair of parallel transmission lines comprising:
   (a) data signal source means for generating a data signal current at a predetermined transmission frequency;
   (b) magnetic coupling means for applying said signal current to one of said transmission lines at a predetermined location thereon; and
   (c) impedance means connected between said pair of transmission lines adjacent to said coupling means for applying said signal current to the other of said transmission lines, said impedance means exhibiting a low impedance at said transmission frequency.

2. The data transmission system of claim 1, wherein said impedance means is a series resonant circuit at said transmission frequency.

3. The data transmission system of claim 2, wherein said magnetic coupling means comprises a transformer including a coil and a core, said core inductively coupling a signal current in said coil to said one transmission line.

4. The data transmission system of claim 3, wherein said impedance means comprises a first impedance connected between said transmission lines at one side of said predetermined location and a second impedance connected between said transmission lines at the other side of said predetermined point, and further including switch means in series with each said impedance for selectively connecting or disconnecting each said impedance from between said lines.

5. The data transmission system of claim 4, further including receiver means connected to said magnetic coupling means for receiving data signals in said transmission lines therefrom.

6. The data transmission system of claim 1, wherein said magnetic coupling means comprises a transformer including a coil and a core, said core inductively coupling a signal current in said coil to said one transmission line.

7. The data transmission system of claim 1, wherein said impedance means comprises a first impedance connected between said transmission lines at one side of said predetermined location and a second impedance connected between said transmission lines at the other side of said predetermined location, and further including switch means in series with each said impedance for selectively connecting or disconnecting each said impedance from between said lines.

8. The data transmission system of claim 1, further including receiver means connected to said magnetic coupling means for receiving data signals in said transmission lines.

9. The data transmission system of claim 1, further including switch means in series with said impedance means for selectively connecting or disconnecting said impedance means across said transmission lines.

10. The data transmission system of claim 2, further including means for applying a signal voltage across said transmission lines.

11. The data transmission system of claim 10, wherein said means for applying a signal voltage comprises a second coil in said transformer, the ends of said second coil being connected across said transmission lines.

* * * * *